(12) United States Patent
Knost et al.

(10) Patent No.: US 7,156,293 B2
(45) Date of Patent: Jan. 2, 2007

(54) DEVICE AND METHOD FOR THE PRODUCTION AND THE SALE OF DOUGH PIECES

(75) Inventors: Dieter Knost, Dinkelsbühl (DE);
Thomas Schmidt, Martinsheim (DE);
Alexander Meier, Dürrwangen (DE);
Christian Habermann, Weiltingen (DE); Bernd Dannenhauer, Dinkelsbühl (DE); Frank Blümel, Mönchsroth (DE)

(73) Assignee: Werner & Pfleiderer Lebensmitteltechnik GmbH, Dinkelsbuhl (DE)

( * ) Notice: Subject to any disclaimer, the term of this patent is extended or adjusted under 35 U.S.C. 154(b) by 152 days.

(21) Appl. No.: 10/943,160

(22) Filed: Sep. 17, 2004

(65) Prior Publication Data
US 2005/0061869 A1 Mar. 24, 2005

(30) Foreign Application Priority Data
Sep. 18, 2003 (DE) .............................. 103 43 706

(51) Int. Cl.
*G06F 17/00* (2006.01)
(52) U.S. Cl. ..................................... 235/375
(58) Field of Classification Search ................. 235/375
See application file for complete search history.

(56) References Cited

U.S. PATENT DOCUMENTS

| 4,398,651 A | 8/1983 | Kumpfer |
| 4,671,425 A | 6/1987 | Knoll |
| 4,944,218 A * | 7/1990 | Cresson ........................ 99/357 |
| 6,065,390 A * | 5/2000 | Florindez ..................... 99/334 |
| 2002/0169628 A1 | 11/2002 | Bauer |
| 2003/0155369 A1 | 8/2003 | Frem |

FOREIGN PATENT DOCUMENTS

| DE | 38 15 466 A1 | 11/1989 |
| DE | 10026899 A1 | 6/2000 |
| DE | 10218178 A1 | 4/2002 |
| DE | 2003-203 02 346 U1 | 4/2003 |
| EP | 0157245 A2 | 3/1985 |
| FR | 2 821 524 | 9/2002 |
| FR | 2 841 025 | 12/2003 |
| WO | WO 01/13342 A1 | 2/2001 |

* cited by examiner

*Primary Examiner*—Daniel Stcyr
(74) *Attorney, Agent, or Firm*—Browdy and Neimark, PLLC

(57) ABSTRACT

A device for the production and the sale of dough pieces comprises at least a first supply bin for keeping a predetermined first quantity of the raw dough pieces. A first recording unit serves the recording of a customer request. A display device serves the display of a price for the recorded customer request. A payment transaction is recorded by means of a second recording unit. A baking device serves the baking of raw dough pieces pursuant to the customer's request to ready-baked dough pieces. The ready-baked dough pieces are made available in at least one supply bin that is accessible to the customer. Two delivery units serve the delivery of the raw dough pieces and/or of the ready-baked dough pieces from the first supply bin to the baking device and/or from baking device to the second supply bin. Depending upon the data recorded by the recording units, a control unit controls the delivery units and the baking device. The result is a device and a method that can be applied by means of it and operated in a cost-efficient way for the production and the sale of dough pieces.

8 Claims, 4 Drawing Sheets

DEVICE AND METHOD FOR THE PRODUCTION AND THE SALE OF DOUGH PIECES

BACKGROUND OF THE INVENTION

1. Field of the Invention

The invention relates to a device as well as to a method for the production and the sale of dough pieces, involving self-service by the customer.

2. Background Art

Such devices and methods are known from an obvious prior use in super-markets where different types of ready-baked dough pieces are kept in a set of supply bins. At the same time, these known devices provide for a baking oven which is—when need arises—manually filled and/or emptied at the end of the baking process. Owing to the personnel that is required in this process, these known devices and methods can still be improved.

SUMMARY OF THE INVENTION

Consequently, it is an object of the present invention to provide a device as well as a method for the production and the sale of dough pieces on the basis of customer self-service that can by applied in a more cost-efficient manner.

According to the invention, this object is achieved by a device

- with at least one first supply bin for keeping a pre-determined first quantity of raw dough pieces,
- with a first recording unit for recording a customer request,
- with a display unit for displaying a price for the recorded customer request,
- with a second recording unit for recording a payment transaction,
- with a baking device for the baking of raw dough pieces to ready-baked dough pieces pursuant to the customer request,
- with a first delivery unit for the delivery of the raw dough pieces from the first supply bin to the baking device,
- with at least one second supply bin for ready-baked dough pieces which is accessible for the customer,
- with a second delivery unit for the delivery of ready-baked dough pieces from the baking device to the second supply bin, and
- with a control unit which controls, dependent upon the data recorded by the recording units, the delivery units and the baking device as well as by a method comprising the following steps:

- keeping of a pre-determined first quantity of raw dough pieces,
- recording of a customer request,
- display of a price for the recorded customer request,
- recording of a payment transaction,
- baking of raw dough pieces according to the customer request to ready-baked dough pieces,
- making available the dough pieces in at least one supply bin which is accessible to the customer.

After feeding the device with a pre-determined first quantity of unbaked dough pieces that are still to be baked, the operation of the device according to the invention is fully automatic. The raw dough pieces that are to be baked may be dough pieces or pre-baked dough pieces, frozen or fully thawed or partly thawed or in another interim state of processing. The dough pieces or raw dough pieces may, for instance, be stored under vacuum conditions. Owing to the fully automatic operation it is possible to provide freshly baked dough pieces around the clock upon the customer's request. The device and/or the method can be designed in such a way that the baking as such is always started only after a customer's request so that the customer will receive goods that are absolutely fresh. After the feeding of the first quantity of raw dough pieces, no further staff is required. The device according to the invention as well as the method according to the invention can be used in smaller bakeries during additional opening hours where no staff is required. Alternatively, an operation in food retail shops, at discount shops, at filling stations, in cinemas or at public events, such as concerts or festive events is possible.

Further recording devices comprising at least one other recording unit for recording at least one of a first quantity of raw dough pieces in the first supply bin and a second quantity of ready-baked dough pieces in the second supply bin permit a precise control of the processed quantity of dough pieces. It is, in particular, possible to check when the first supply bin needs a re-filling. Furthermore, a pre-determined second quantity of ready-baked dough pieces can be kept in the second supply bin where the availability of the second quantity can also be monitored by means of a recording device. This makes it possible that, upon a customer's request, there is no need to wait for a baking step but that an immediate removal of ready-baked dough pieces is possible.

A record unit having a control panel permits an operation of a device according to the invention of the type of an automatic telling machine.

When using a recording device, wherein the first recording unit for recording a customer request is designed in such a way that the customer request is recorded by inquiring about a customer's advance order with the control unit in particular being designed in such a way that taking into account the customer's advance order recorded by means of the first recording unit and the output data of the other recording units for recording the quantities of raw dough pieces, on the one hand, and of ready-baked dough pieces in the supply bins, on the other hand, the second quantity of dough pieces is adjusted and the delivery units and the baking device are activated in such a way that the second quantity of dough pieces is kept in the second supply bin, the quantity that is kept in the second supply bin is pre-determined in particular on the basis of the relevant advance orders of the customers. This makes it possible to cope for instance with a rush of customers at times when the device is heavily frequented, for instance on Sunday morning.

A device, wherein the first recording unit is provided with data remote transfer unit to which a communication connection can be set up via a customer terminal, in particular via a mobile phone or the Internet, facilitates a particularly convenient way of placing advance orders.

A device, wherein the first recording unit is provided with a re-confirmation module for re-confirming the advance order of a customer, permits an easy acknowledgement of the advance order.

A device, wherein the first recording unit is provided with a re-confirmation module for transmitting an access code, in particular a numeric data code and wherein another recording unit for the recording of a customer input of the access code is provided where the second supply bin in particular is provided with a locking device which is released depending upon the recorded access code, facilitates the allocation of the advance order to the customer concerned.

The advantages of aforesaid method are in conformity with those that were discussed above in connection with the device according to the present invention.

Embodiments of the present invention are explained below in greater detail on the basis of the relevant drawing.

DESCRIPTION OF THE PREFERRED EMBODIMENTS

Figure 1:
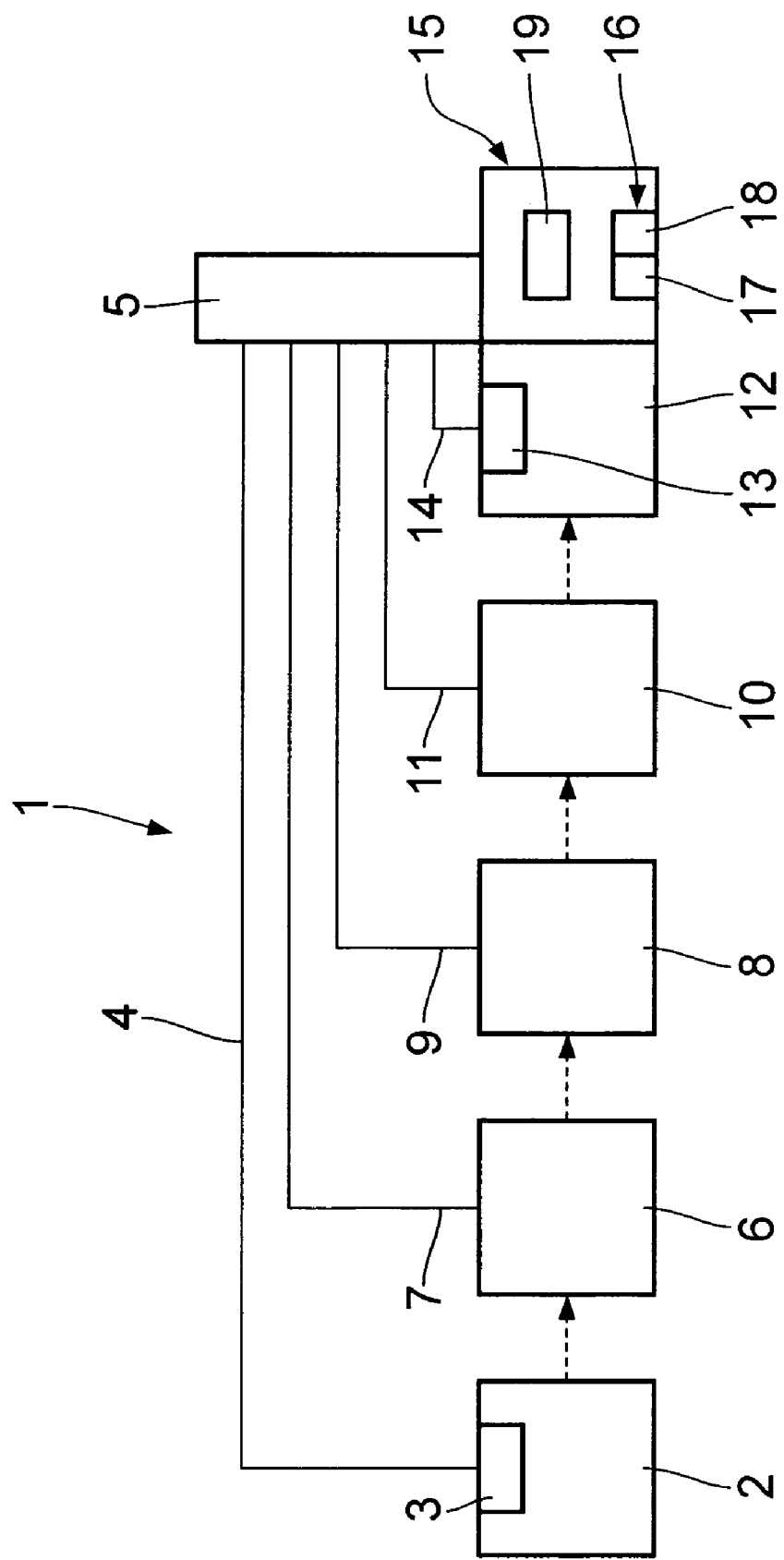
FIG. 1 is a diagrammatic representation of a device for the production and the sale of dough pieces.

FIG. 1 shows a diagrammatic representation of a device 1 for the production and the sale of dough pieces. Device 1 comprises a first supply bin 2 in which a pre-determined first quantity of in particular partly frozen or deep-frozen raw dough pieces are kept, as a scale. Alternatively, raw dough pieces and/or dough pieces which are pre-baked or which are available in a different state of processing, for instance also raw dough pieces and/or dough pieces which are stored for instance also under vacuum conditions can be kept. For the recording of this first quantity of raw dough pieces, the first supply bin 2 is provided with a quantity recording unit 3. This unit can be designed as a filling level sensor or also as a counting unit for the raw dough pieces which are fed into the first supply bin 2. Instead of a single first supply bin 2, also a plurality of first supply bins 2, in particular for different types of raw dough pieces, can be provided. The quantity recording unit 3 is connected via a signal line 4 with a central control unit 5 of device 1.

The first supply bin 2 is in delivery engagement with a first delivery unit 6 as is indicated in FIG. 1 by a dotted arrow. The first delivery unit 6 is connected with control unit 5 by a signal line 7. The first delivery unit 6 delivers the raw dough pieces from the first supply bin 2 to the inlet of a baking device 8 for the baking of the raw dough pieces. Baking device 8 is in particular a rotary oven which is heated by circulating air through which the raw dough pieces are transported. Baking unit 8 is connected with control unit 5 via a signal line 9. Baking unit 8 is at its exit in delivery engagement for raw dough pieces with a second delivery unit 10. The latter is connected with control unit 5 via a signal line 11. The second delivery unit 10 delivers the baked raw dough pieces from baking unit 8 to a second supply bin 12 for the dough pieces which is accessible to the customers. The second supply bin 12 is provided with another quantity recording unit 13 which may have the same design as the quantity recording unit 3 of the first supply bin 2. The quantity recording unit 13 is connected with control unit 5 via a signal line 14. The second supply bin 12, too, can be subdivided into a plurality of individual supply bins, in particular for specific types of dough pieces.

Adjacent to the second supply bin 12, device 1 is provided with a customer terminal 15. This terminal is in signal connection with control unit 5. The customer terminal 15 is provided with an input panel 16 which is subdivided into a first recording unit 17 for recording a customer request, i.e. the type and the quantity of the desired dough pieces and with a second recording unit 18 for recording a payment operation. The first recording unit 17 can for instance be designed as an input keyboard or as a touch-screen display. The second recording unit 18 can also be designed as a coin slot or as an input/processing device for bank notes, money cards, EC cards or check identification cards or also for specific customer cards. Moreover, customer terminal 15 comprises a display 19.

Figure 2:
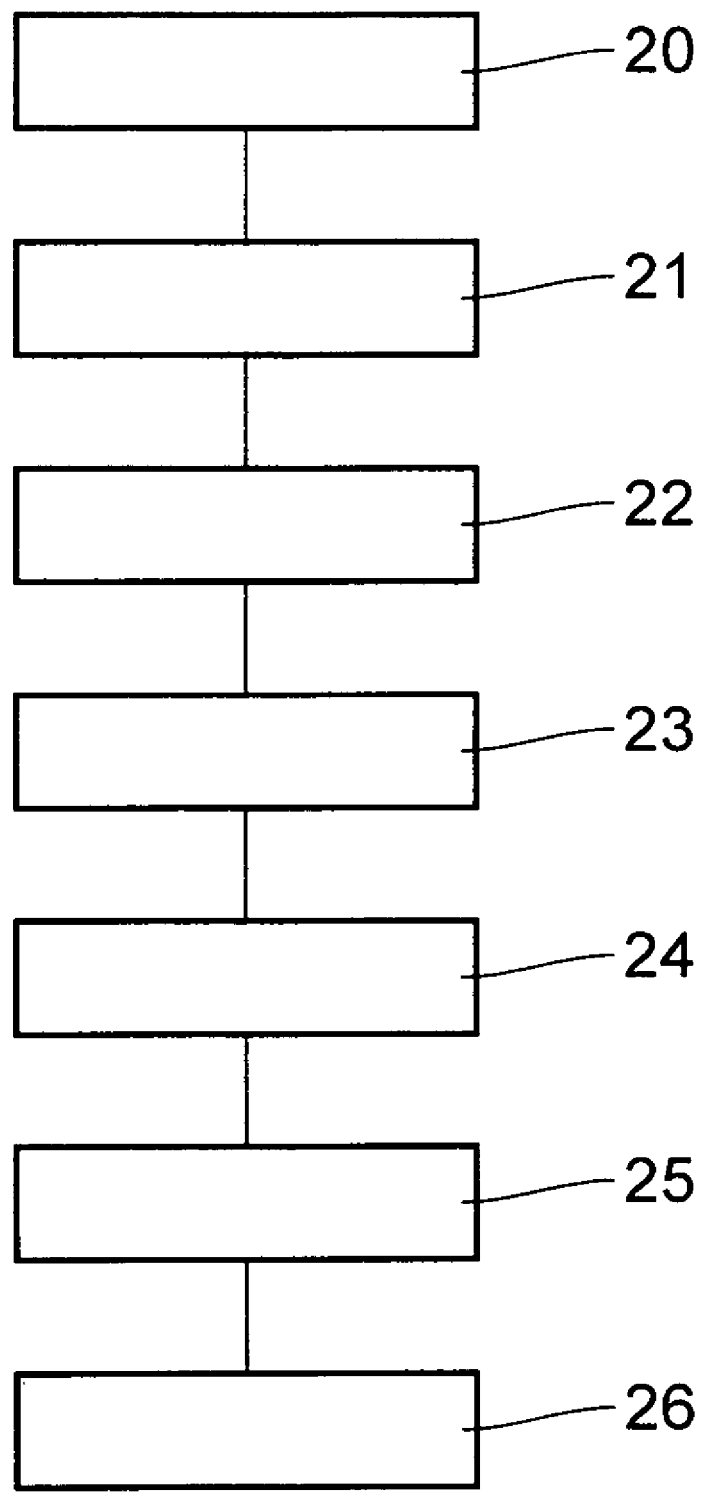
FIG. 2 is a schematic flow chart of a device for the production and the sale of dough pieces.

The sequence of a method for the production and the sale of dough pieces by means of device 1 according to FIG. 1 is described below using the schematic flow chart of FIG. 2:

As a first preparatory step 20, a pre-determined first quantity of raw dough pieces is kept in the first supply bin 2. This first quantity is monitored by the quantity recording unit 3. Relevant quantity data are transmitted via signal line 4 to control unit 5. In another, optional preparatory step 21, the two delivery units 6, 10 and the baking device 8 are activated by control unit 5, controlled via signal lines 7, 9, 11 in such a manner that a pre-determined second quantity of ready-baked dough pieces is kept in the second supply bin 12. The first and second quantities which are pre-determined in the preparatory steps 20, 21 are monitored via the quantity recording units 3, 13.

The customer's request is recorded in a recording step 22 by reading out by means of control unit 5 the customer's input entered the first recording unit 17. On the basis of the customer's request, control unit 5 calculates the respective price and shows the same on display 19 in an output operation 23. Payment by the customer is recorded by customer terminal 15 via the second recording unit 18 in recording step 24. This information, too, is transmitted to control unit 5. Recording step 24 can, for instance, be the registration of the insertion of coins or of a bank note into the respective slot. Alternatively, recording step 24 can register a money card or an EC card or a check identification card or a specific customer card. For this purpose, customer terminal 15 is optionally connected via a telecommunication line (not shown) with the bank concerned.

Following recording step 24, control unit 5 activates in a baking step 25 the first delivery unit 6, baking unit 8 as well as the second delivery unit 10 in such a way that the desired quantities of the desired types of dough pieces are available in the second supply bin 12. In a delivery step 26, the desired dough pieces are made available in supply bin 12 for their removal by the customer.

Another embodiment of a device for the production and the sale of dough pieces is described below with reference to FIG. 3 and FIG. 4. Details of the device as well as of the method for the production and the sale of dough pieces which correspond to those which have already been explained with reference to FIG. 1 and FIG. 2 have the same reference numbers and are not explained once again in detail.

Figure 3:
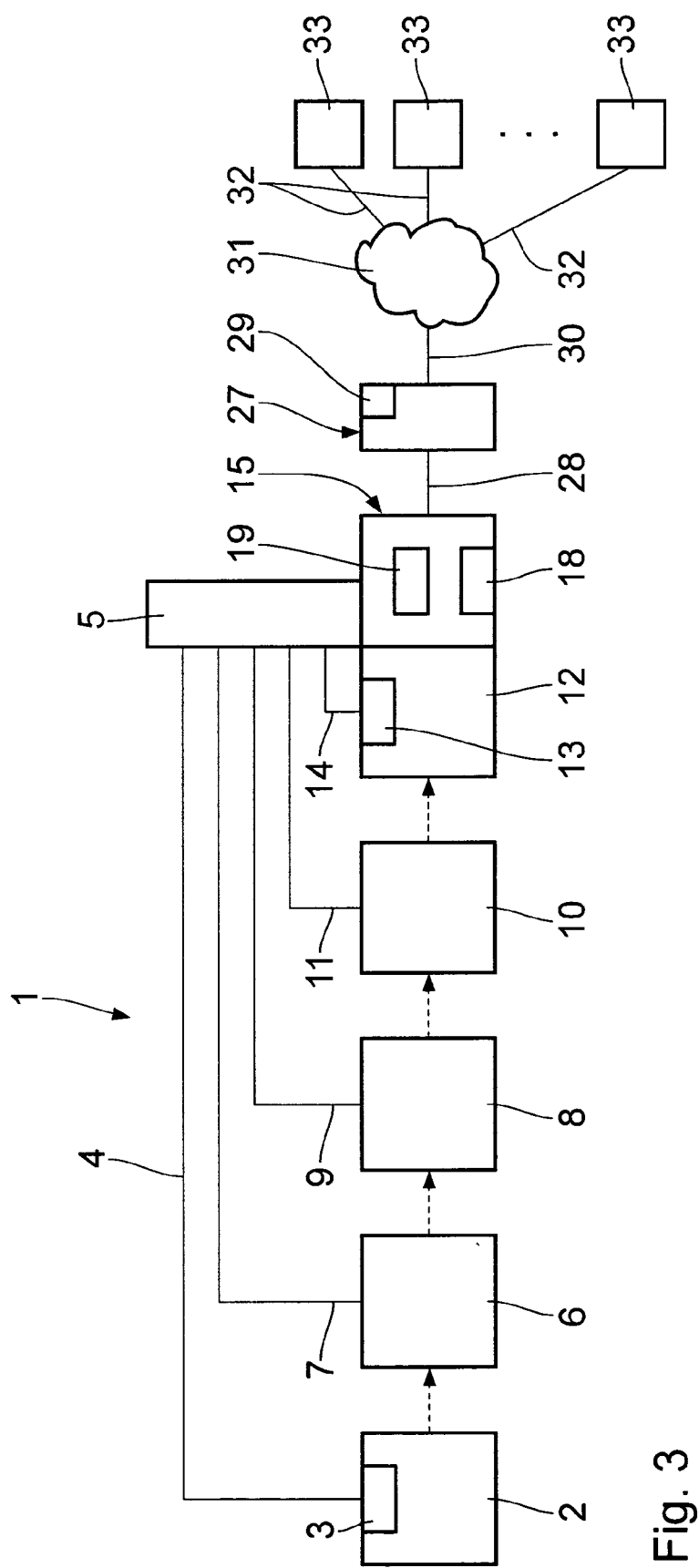
FIG. 3 is a diagrammatic representation of another embodiment of a device for the production and the sale of dough pieces.

Instead of the first recording unit 17 of the embodiment according to FIG. 1, device 1 according to FIG. 3 is provided with a first recording unit 27 suitable for data remote transfer which is connected with customer terminal 15 via a signal line 28. The first recording unit 27 of the embodiment according to FIG. 3 serves for recording an external advance order of a customer. For the re-confirmation of such a customer's advance order the first recording unit 27 is provided with a re-confirmation module 29. Via a data circuit 30 the first recording unit 27 is connected with a WAN (Wide Area Network), for instance the Internet or a telephone network. The latter is connected via further data circuits 32 with external customer terminals 33, for instance a mobile phone or a PC.

With reference to the schematic flow chart according to FIG. 4, a method for the production and the sale of dough pieces with device 1 according to FIG. 3 is described below. In the method according to FIG. 4, recording step 22 is at first followed by a re-confirmation step 34. For this purpose, the re-confirmation module 29 transmits via the first recording unit 27 and WAN 31 the quantity and the type of the dough pieces ordered in advance and the respective price to the relevant customer terminal 33. In this case, the first recording unit 27 is a display unit of the embodiment according to FIG. 3 and FIG. 4 for the display of a price for the recorded customer request. Moreover, reconfirmation module 29 transmits in a transmission step 35 an access code, in particular a numeric data code by means of which the customer can identify himself/herself when collecting the advance order at customer terminal 15. When collecting the dough pieces ordered in advance, the customer then first enters in the recording unit 18 of customer terminal 15 in an identification step 36 the access code which was received in transmission step 35. The identification of the customer in identification step 36 is followed by steps 24 to 26 as described in connection with FIG. 2.

Figure 4:
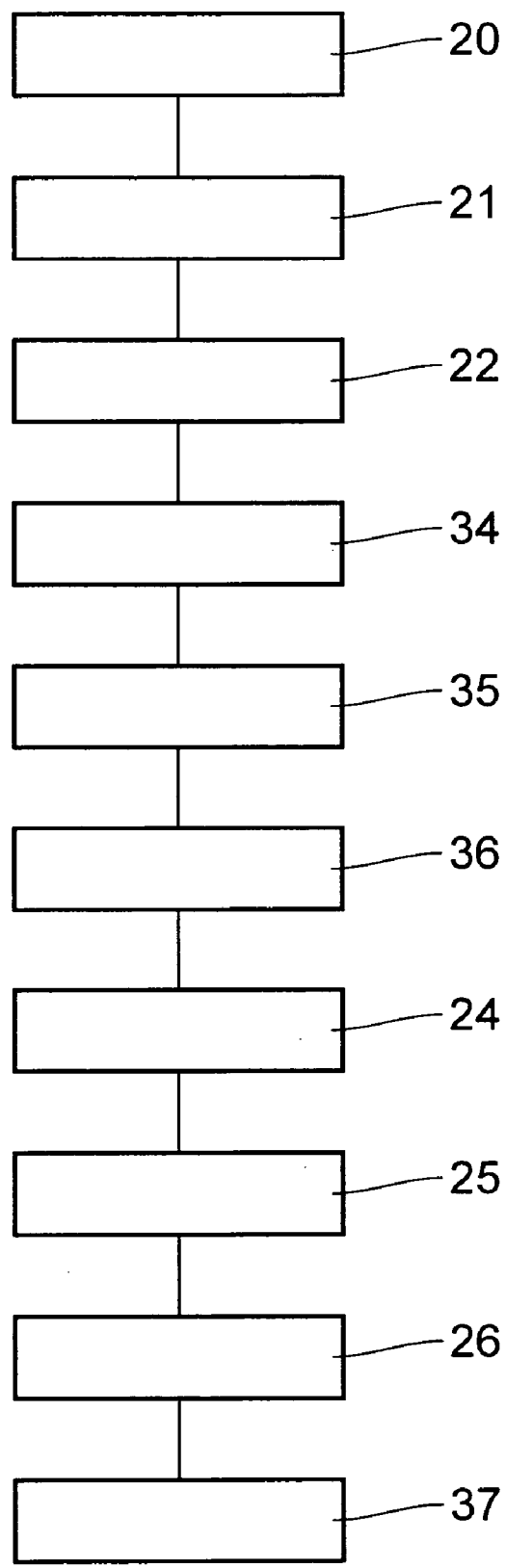
FIG. 4 is a schematic flow chart of another method for the production and the sale of dough pieces.

In another embodiment of the method according to FIG. 4, the first recording unit 27 transmits to control unit 5 the entered data as to quantity and type of an advance order by a customer together with the collection time as stated by the customer. In good time before the said collection time, control unit 5 activates delivery units 6 and 10 as well as the baking units 8 for the production of the desired dough pieces. These dough pieces are then already available in supply bin 12 before identification step 36. When payment is made (recording step 24), a locking device of the second supply bin 12 is released in a release step 37 which is controlled via control unit 5.

Alternatively to a payment at customer terminal 15, a payment via WAN 31 can be made in particular in the embodiment according to FIG. 3 and FIG. 4. In this case, the first recording unit 27 is at the same time the recording unit for the recording of the payment transaction. In an embodiment of device 1 according to FIG. 3, a first recording unit 17 is provided in addition to the first recording unit 27 which corresponds to the unit which has already been described in connection with the embodiment according to FIG. 1 and FIG. 2.

What is claimed is:

1. Device (1) for the production and the sale of dough pieces
   with at least one first supply bin (2) for keeping a pre-determined first quantity of raw dough pieces,
   with a first recording unit (17; 27) for recording a customer request,
   with a display unit (19; 27) for displaying a price for the recorded customer request,
   with a second recording unit (18; 18, 17) for recording a payment transaction,
   with a baking device (8) for the baking of raw dough pieces to ready-baked dough pieces pursuant to the customer request,
   with a first delivery unit (6) for the delivery of the raw dough pieces from the first supply bin (2) to the baking device(S),
   with at least one second supply bin (12) for ready-baked dough pieces which is accessible for the customer,
   with a second delivery unit (10) for the delivery of ready-baked dough pieces from the baking device (8) to the second supply bin (12), and
   with a control unit (5) which controls, dependent upon the data recorded by the recording units (17, 18; 18, 27), the delivery units (6, 10) and the baking device (8),
   wherein one of the recording units (3, 13, 17, 18; 3, 13, 18, 27) comprises a control panel,
   wherein the first recording unit (27) for recording a customer request is designed in such a way that the customer request is recorded by inquiring about a customer's advance order with the control unit (5) being designed in such a way that taking into account the customer's advance order recorded by means of the first recording unit (27) and the output data of the other recording units (3, 13) for recording the quantities of raw dough pieces, on the one hand, and of ready-baked dough pieces in the supply bins (2, 12), on the other hand, the second quantity of dough pieces is adjusted and the delivery units (6, 10) and the baking device (8) are activated in such a way that the second quantity of dough pieces is kept in the second supply bin (12).

2. Device according to claim 1, comprising at least one other recording unit (3, 13) for recording at least one of a first quantity of raw dough pieces in the first supply bin (2) and for recording a second quantity of ready-baked dough pieces in the second supply bin (12).

3. Device according to claim 1, wherein the first recording unit (27) is provided with data remote transfer unit to which a communication connection can be set up via a customer terminal (33), via a mobile phone or the Internet.

4. Device according to claim 1, wherein the first recording unit (27) is provided with a re-confirmation module (29) for re-confirming the advance order of a customer.

5. Device according to claim 1, wherein the first recording unit (27) is provided with a re-confirmation module (29) for transmitting a numeric data access code and wherein another recording unit (18) for the recording of a customer input of the access code is provided where the second supply bin (12) is provided with a locking device which is released depending upon the recorded access code.

6. Device (1) for the production and the sale of dough pieces
   with at least one first supply bin (2) for keeping a pre-determined first quantity of raw dough pieces,
   with a first recording unit (17; 27) for recording a customer request,
   with a display unit (19; 27) for displaying a price for the recorded customer request,
   with a second recording unit (18; 18, 17) for recording a payment transaction,
   with a baking device (8) for the baking of raw dough pieces to ready-baked dough pieces pursuant to the customer request,
   with a first delivery unit (6) for the delivery of the raw dough pieces from the first supply bin (2) to the baking device(8),
   with at least one second supply bin (12) for ready-baked dough pieces which is accessible for the customer,
   with a second delivery unit (10) for the delivery of ready-baked dough pieces from the baking device (8) to the second supply bin (12), and
   with a control unit (5) which controls, dependent upon the data recorded by the recording units (17, 18; 18, 27), the delivery units (6, 10) and the baking device (8)
   wherein one of the recording units (3, 13, 17, 18; 3, 13, 18, 27) comprises a control panel,
   wherein the first recording unit (27) for recording a customer request is designed in such a way that the customer request is recorded by inquiring about a customer's advance order with the control unit (5) being designed in such a way that taking into account the customer's advance order recorded by means of the first recording unit (27) and the output data of the other recording units (3, 13) for recording the quantities of raw dough pieces, on the one hand, and of ready-baked dough pieces in the supply bins (2, 12), on the other hand, the second quantity of dough pieces is adjusted and the delivery units (6, 10) and the baking device (8) are activated in such a way that the second quantity of dough pieces is kept in the second supply bin (12), wherein the first recording unit (27) is provided with data remote transfer unit to which a communication connection can be set up via a customer terminal (33), via a mobile phone or the Internet.

7. Device (1) for the production and the sale of dough pieces with at least one first supply bin (2) for keeping a pre-determined first quantity of raw dough pieces, with a first recording unit (17; 27) for recording a customer request, with a display unit (19; 27) for displaying a price for the recorded customer request, with a second recording unit (18; 18, 17) for recording a payment transaction, with a baking device (8) for the baking of raw dough pieces to ready-baked dough pieces pursuant to the customer request, with a first delivery unit (6) for the delivery of the raw dough pieces from the first supply bin (2) to the baking device(8), with at least one second supply bin (12) for ready-baked dough pieces which is accessible for the customer, with a second delivery unit (10) for the delivery of ready-baked dough pieces from the baking device (8) to the second supply bin (12), and with a control unit (5) which controls, dependent upon the data recorded by the recording units (17, 18; 18, 27), the delivery units (6, 10) and the baking device (8), wherein one of the recording units (3, 13, 17, 18; 3, 13, 18, 27) comprises a control panel, wherein the first recording unit (27) for recording a customer request is designed in such a way that the customer request is recorded by inquiring about a customer's advance order with the control unit (5) being designed in such a way that taking into account the customer's advance order recorded by means of the first recording unit (27) and the output data of the other recording units (3, 13) for recording the quantities of raw dough pieces, on the one hand, and of ready-baked dough pieces in the supply bins (2, 12), on the other hand, the second quantity of dough pieces is adjusted and the delivery units (6, 10) and the baking device (8) are activated in such a way that the second quantity of dough pieces is kept in the second supply bin (12), wherein the first recording unit (27) is provided with a re-confirmation module (29) for re-confirming the advance order of a customer.

8. Device (1) for the production and the sale of dough pieces with at least one first supply bin (2) for keeping a pre-determined first quantity of raw dough pieces, with a first recording unit (17; 27) for recording a customer request, with a display unit (19; 27) for displaying a price for the recorded customer request, with a second recording unit (18; 18, 17) for recording a payment transaction, with a baking device (8) for the baking of raw dough pieces to ready-baked dough pieces pursuant to the customer request, with a first delivery unit (6) for the delivery of the raw dough pieces from the first supply bin (2) to the baking device(8), with at least one second supply bin (12) for ready-baked dough pieces which is accessible for the customer, with a second delivery unit (10) for the delivery of ready-baked dough pieces from the baking device (8) to the second supply bin (12), and with a control unit (5) which controls, dependent upon the data recorded by the recording units (17, 18; 18, 27), the delivery units (6, 10) and the baking device (8), wherein one of the recording units (3, 13, 17, 18; 3, 13, 18, 27) comprises a control panel, wherein the first recording unit (27) for recording a customer request is designed in such a way that the customer request is recorded by inquiring about a customer's advance order with the control unit (5) being designed in such a way that taking into account the customer's advance order recorded by means of the first recording unit (27) and the output data of the other recording units (3, 13) for recording the quantities of raw dough pieces, on the one hand, and of ready-baked dough pieces in the supply bins (2, 12), on the other hand, the second quantity of dough pieces is adjusted and the delivery units (6, 10) and the baking device (8) are activated in such a way that the second quantity of dough pieces is kept in the second supply bin (12), wherein the first recording unit (27) is provided with a re-confirmation module (29) for transmitting a numeric data access code and wherein another recording unit (18) for the recording of a customer input of the access code is provided where the second supply bin (12) in particular is provided with a locking device which is released depending upon the recorded access code.

* * * * *